(12) United States Patent
Moriya et al.

(10) Patent No.: US 11,110,731 B2
(45) Date of Patent: Sep. 7, 2021

(54) METHOD FOR APPLYING INK AND METHOD FOR PRODUCING WALLPAPER

(71) Applicants: Yoshihiro Moriya, Shizuoka (JP); Tatsuya Morita, Tokyo (JP); Andrew McVitie, Stirlingshire (GB); John Hamilton, Stirlingshire (GB); Derek Smith, Stirlingshire (GB)

(72) Inventors: Yoshihiro Moriya, Shizuoka (JP); Tatsuya Morita, Tokyo (JP); Andrew McVitie, Stirlingshire (GB); John Hamilton, Stirlingshire (GB); Derek Smith, Stirlingshire (GB)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 16/492,235

(22) PCT Filed: Mar. 9, 2018

(86) PCT No.: PCT/JP2018/009164
§ 371 (c)(1),
(2) Date: Sep. 9, 2019

(87) PCT Pub. No.: WO2018/168675
PCT Pub. Date: Sep. 20, 2018

(65) Prior Publication Data
US 2021/0016586 A1  Jan. 21, 2021

(30) Foreign Application Priority Data
Mar. 16, 2017  (JP) ............................. JP2017-051643

(51) Int. Cl.
*B41M 5/00* (2006.01)
*B41M 3/18* (2006.01)
*B41M 7/00* (2006.01)
*C09D 11/322* (2014.01)
*C09D 11/36* (2014.01)

(52) U.S. Cl.
CPC ............ *B41M 3/18* (2013.01); *B41M 5/0011* (2013.01); *B41M 5/0064* (2013.01);
(Continued)

(58) Field of Classification Search
CPC .... B41M 3/18; B41M 7/0081; B41M 5/0011; B41M 7/0072; B41M 5/0064; B41M 7/009; C09D 11/36; C09D 11/322
See application file for complete search history.

(56) References Cited

U.S. PATENT DOCUMENTS

2011/0234728 A1  9/2011  Aoki et al.
2012/0128949 A1  5/2012  Goto
(Continued)

FOREIGN PATENT DOCUMENTS

EP  3124279 A1  2/2017
JP  09-060632  3/1997
(Continued)

OTHER PUBLICATIONS

International Search Report dated Jun. 14, 2018 for counterpart International Patent Application No. PCT/JP2018/009164 filed Mar. 9, 2018.
(Continued)

*Primary Examiner* — Yaovi M Ameh
(74) *Attorney, Agent, or Firm* — Grüneberg and Myers PLLC

(57) ABSTRACT

Provided is a method for applying an ink for applying an oil-based ink to a resin composition layer of a target including a base and the resin composition layer formed over a surface of the base, the method including: a pretreatment step of pre-treating the target before the oil-based ink is applied, with at least one surface treatment for improving a wetting/spreading property of the oil-based ink; a step of applying the oil-based ink to the target that has undergone
(Continued)

the pretreatment step; and a post-treatment step of post-treating the target after the oil-based ink is applied, with at least one surface treatment for improving a wetting/spreading property of the oil-based ink.

14 Claims, 3 Drawing Sheets

(52) U.S. Cl.
CPC .......... *B41M 7/009* (2013.01); *B41M 7/0072* (2013.01); *B41M 7/0081* (2013.01); *C09D 11/322* (2013.01); *C09D 11/36* (2013.01)

(56) References Cited

U.S. PATENT DOCUMENTS

| | | | |
|---|---|---|---|
| 2016/0260360 A1* | 9/2016 | Ueda | ........................... C09J 7/29 |
| 2017/0107389 A1 | 4/2017 | Umemura et al. | |
| 2017/0320253 A1* | 11/2017 | Salant | ..................... B32B 15/04 |

FOREIGN PATENT DOCUMENTS

| | | | | |
|---|---|---|---|---|
| JP | 10-264501 | | 10/1998 | |
| JP | 2000-117958 | | 4/2000 | |
| JP | 2000-318038 | | 11/2000 | |
| JP | 2000318038 A | * | 11/2000 | ............. B29C 59/04 |
| JP | 2002-302629 A | | 10/2002 | |
| JP | 2003-237217 | | 8/2003 | |
| JP | 2005-171056 A | | 6/2005 | |

OTHER PUBLICATIONS

Written Opinion dated Jun. 14, 2018 for counterpart International Patent Application No. PCT/JP2018/009164 filed Mar. 9, 2018.
Japanese Office Action dated Mar. 5, 2021 in Japanese Patent Application No. 2017-051643, 2 pages.

* cited by examiner

[Fig. 1]
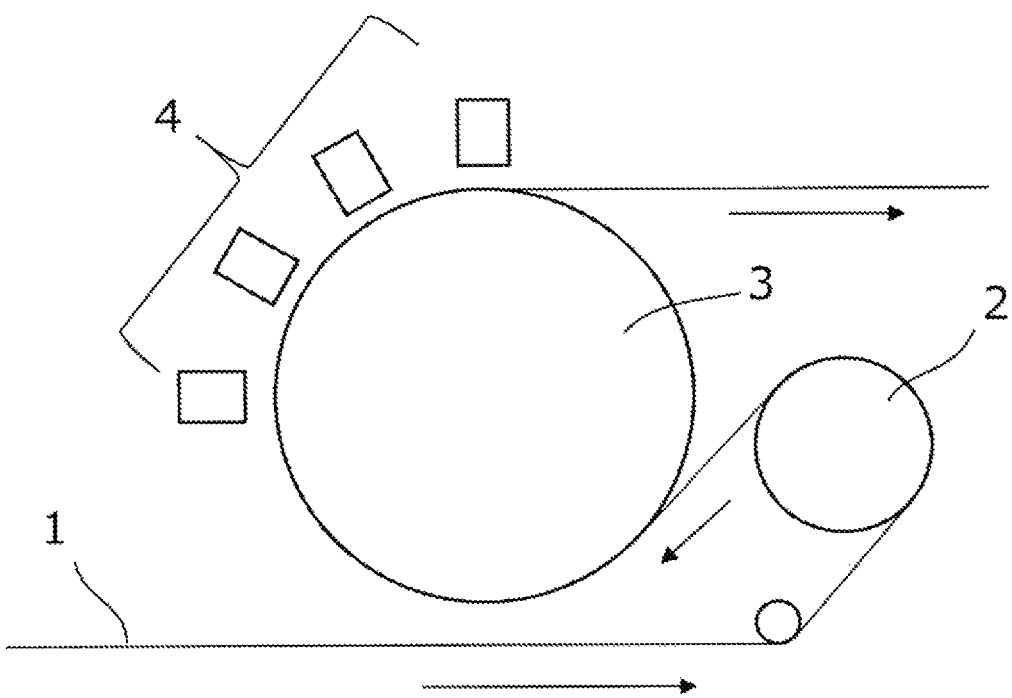
[Fig. 2]
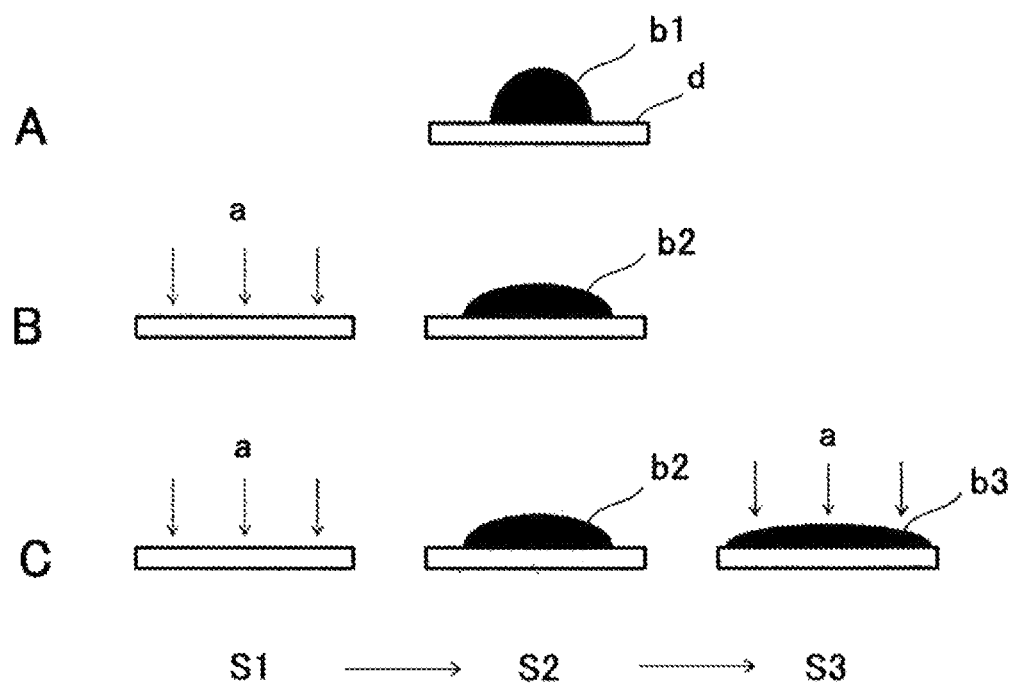

[Fig. 3A]
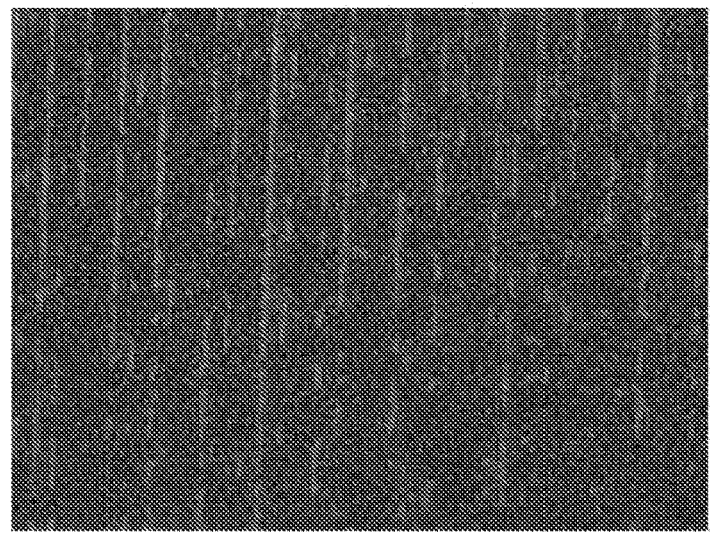
[Fig. 3B]
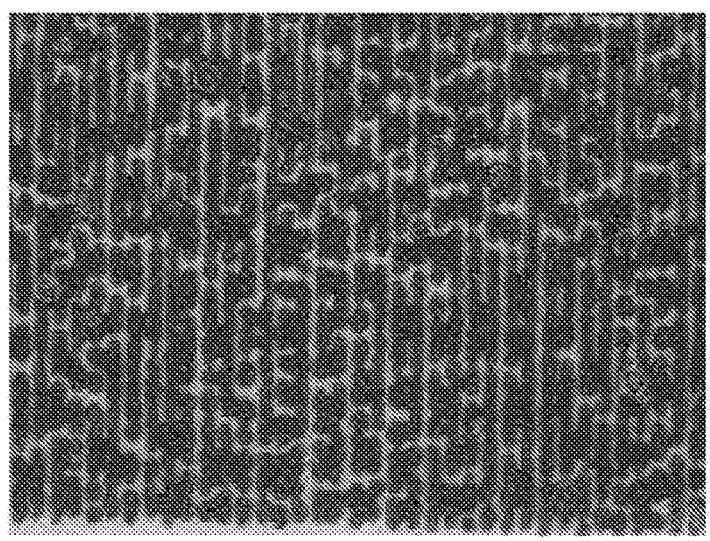
[Fig. 3C]

[Fig. 3D]
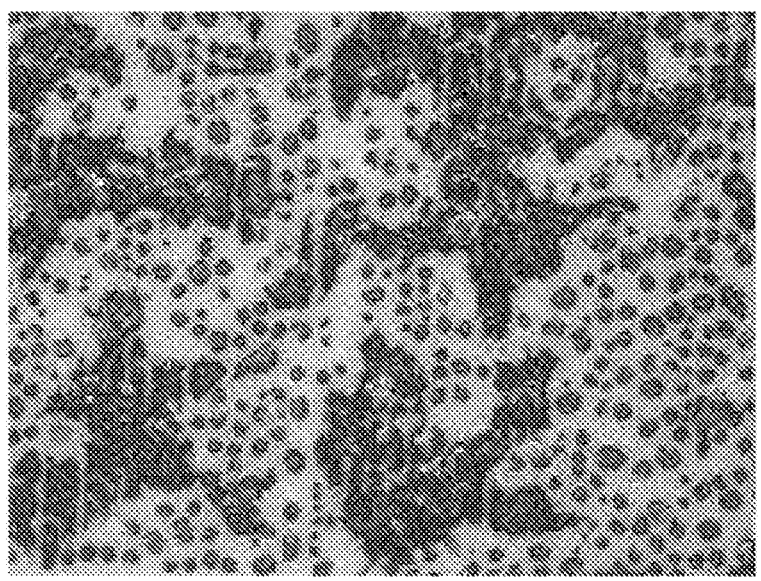

METHOD FOR APPLYING INK AND METHOD FOR PRODUCING WALLPAPER

TECHNICAL FIELD

The present disclosure relates to a method for applying an ink for discharging an ink by an inkjet method to apply the ink to a target, and a method for producing a wallpaper.

BACKGROUND ART

Hitherto, sheet-like wallpapers having good designs have been used on buildings' internal walls and ceilings.

These wallpapers are typically formed of noninflammable base paper or noninflammable non-woven fabric from the viewpoints of an adhesive property on wall surfaces, non-inflammability, and fireproofness. Further, these wallpapers have scratch-resistant, stainproof resin layers on the surfaces. Most of the resin layers are formed of polyvinyl chloride-based resins containing plasticizers mainly formed of ester oils. Furthermore, it has been widely known to further add foaming agents to the resin layers to foam the resin layers and impart flexibility to the resin layers, or to emboss the resin layers to impart stereoscopic decorations to the resin layers.

In recent years, attempts have been made to print desired images on the resin layers by inkjet methods and apply the resin layers to the wallpapers. However, the vinyl chloride has a significantly poor ink absorbability due mainly to the material' properties. As a measure for overcoming this problem, attempts have been made to additionally provide an ink receiving layer as the upper layer of the resin layer formed of vinyl chloride, to promote permeation and fixing of an ink, as in, e.g., PTL 1.

Similar studies have also been made for measures using oil-based inks as disclosed in PTL 2. Advantages of the oil-based inks include a high image density attributable to solubility/dispersibility of coloring materials at high densities, a good water resistance, and a good anti-clogging property in head nozzles of inkjet apparatuses. Particularly, in recent years, excellent light resistance and ozone resistance of the oil-based inks have brought the oil-based inks to be widely used on wallpapers for large-sized POP arts, advertisements, and displays.

Meanwhile, in the inkjet image forming methods, there have been known various pretreatment methods such as plasma or corona treatments for improving wettability and fixability of inks on print targets. These methods can maintain quality differences on the surfaces of the print targets to certain states.

PTL 3 further discloses an image forming unit configured to apply a corona treatment both before and after printing.

Oil-based inks, most of which are formed of non-volatile oil constituents, have an extremely poor permeation/absorption property on the resin layers.

When targets are formed of materials such as vinyl chloride having a poor wettability with oil-based inks, the techniques described in the Background Art section cannot secure sufficient wetting/spreading properties of inks on the targets, and hence sufficient image densities and ink absorbability, either.

CITATION LIST

Patent Literature

[PTL 1] Japanese Unexamined Patent Application Publication No. 2000-318038

[PTL 2] Japanese Patent No. 3613029

[PTL 3] Japanese Unexamined Patent Application Publication No. 2000-117958

SUMMARY OF INVENTION

Technical Problem

Hence, as a result of earnest studies, the present inventors have found it possible to improve wetting/spreading properties of an ink before and after image formation separately, with use of an oil-based ink having substantially no driability/curing reactivity in combination with a wettability improving unit before image formation and a wettability improving unit after image formation both employing a specific method.

Hence, the present disclosure has an object to provide a method for applying an ink, the method capable of providing an image having a good quality that is attributable to expression of an effective wettability on even an ink applying-target resin composition having a poor wettability with an oil-based ink.

Solution to Problem

According to one aspect of the present disclosure, a method for applying an ink described below is provided.

The method for applying an ink is a method for applying an oil-based ink to a resin composition layer of a target including a base and the resin composition layer formed over a surface of the base. The method includes a pretreatment step of pre-treating the target before the oil-based ink is applied, with at least one surface treatment for improving a wetting/spreading property of the oil-based ink, a step of applying the oil-based ink to the target that has undergone the pretreatment step, and a post-treatment step of post-treating the target after the oil-based ink is applied, with at least one surface treatment for improving a wetting/spreading property of the oil-based ink.

Advantageous Effects of Invention

The method for applying an ink of the present disclosure can secure a sufficient wetting/spreading property of an ink on a target and hence a sufficient image density and a sufficient ink absorbability.

BRIEF DESCRIPTION OF DRAWINGS

FIG. 1 is a diagram illustrating an example of an inkjet-type ink applying apparatus.

FIG. 2 is a concept diagram illustrating the effect of performing a pretreatment step and a post-treatment step in an embodiment of the present disclosure, where A illustrates a case where neither the pretreatment step nor the post-treatment step is performed, B illustrates a case where only the pretreatment step is performed, and C illustrates a case where both of the pretreatment step and the post-treatment step are performed.

FIG. 3A is a diagram illustrating a case where a coverage by an ink is 80% or higher.

FIG. 3B is a diagram illustrating a case where a coverage by an ink is 70% or higher but lower than 80%.

FIG. 3C is a diagram illustrating a case where a coverage by an ink is 60% or higher but lower than 70%.

FIG. 3D is a diagram illustrating a case where a coverage by an ink is lower than 60%.

DESCRIPTION OF EMBODIMENTS

An embodiment of the present disclosure will be described below. The following description is intended to illustrate an example of an embodiment of the present disclosure and not to limit the scope of the present disclosure.

<Target>

A target of the present disclosure is obtained by forming a resin composition layer over at least one surface of a smooth base formed of paper or non-woven fabric or by forming a resin composition layer over a surface of a three-dimensional article. As a resin, for example, vinyl chloride resins and acrylic-based resins can be used.

The resin composition layer may contain a plasticizer, or may contain a plasticizer and a heat foaming agent. For example, when the target is used as a wallpaper, it is preferable to use the heat foaming agent. In the following description, there may be a case where an example in which the target is used as a wallpaper is described.

When the target is a wallpaper, the base is not particularly limited so long as properties such as mechanical strength and heat resistance suitable as the base of the wallpaper are secured. Any base commonly used for wallpapers, such as paper and non-woven fabric, can be used. More specific examples of the base include natural paper, plastic film, synthetic paper, non-woven fabric, cloth, wooden materials, and metallic thin film. Any base may be selected depending on the application.

For example, when water resistance is needed, the base is preferably a plastic film, synthetic paper formed of synthetic fiber, or a sheet of non-woven fabric.

Examples of the plastic film include a polyester film, a polypropylene film, a polyethylene film, and a product in which plastic films or sheets formed of nylon, vinylon, or acrylic are pasted on each other.

In terms of strength, it is preferable that the plastic film be uniaxially or biaxially stretched.

Examples of the non-woven fabric include a product obtained by distributing polyethylene fibers in a scattered state and bonding the polyethylene fibers together by thermo-compression bonding to form a sheet shape.

When the target is a wallpaper, it is preferable that the resin composition layer formed over one surface of the base include at least a vinyl chloride resin and a plasticizer.

In this case, the resin composition layer is formed by coating the vinyl chloride resin over the base in a state the plasticizer is encapsulated in the vinyl chloride resin.

Vinyl chloride resins are general-purpose resins having excellent physicochemical properties and less expensive than other resins. Therefore, vinyl chloride resins are widely used in the field of soft, semirigid, and rigid resins. Soft vinyl chloride-based resin products are used as resin compositions in which 100 parts by mass of vinyl chloride resins are blended with from 30 parts by mass through 100 parts by mass of plasticizers for the vinyl chloride resins to be swelled and solvated.

For example, a filler, a dispersant, a defoaming agent, an anti-blocking agent, a thickener, and a foaming agent may also be added in the resin composition layer as needed.

The foaming agent is not particularly limited so long as the foaming agent is commonly used in wallpapers. Inorganic foaming agents, organic foaming agents, microcapsule foaming agents may be used alone or in combination.

Preferable examples of organic foaming agents include azodicarboxylic acid amide (ADCA), azobisisobutyronitrile (AIBN), p,p'-oxybisbenzenesulfonyl hydrazide (OBSH), and dinitrosopentamethylene tetramine (DPT).

Preferable examples of inorganic foaming agents include inorganic carbonates such as sodium bicarbonate.

Examples of the filler include various substances such as aluminum hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silicas, titanium dioxide, and magnesium silicate. Among these fillers, calcium carbonate, magnesium carbonate, aluminum hydroxide, and magnesium hydroxide are preferable.

In the present disclosure, it is preferable that the resin composition layer of the target contain a plasticizer. Examples of the plasticizer include: phthalic acid ester-based plasticizers such as dinonyl phthalate (DNP), dioctyl phthalate (DOP), didecyl phthalate (DDP), diisodecyl phthalate (DIDP), diisononyl phthalate (DINP), ditridecyl phthalate (DTDP), and n-hexyl-n-decyl phthalate (NHDP); phosphoric acid ester-based plasticizers such as tri-2-ethylhexyl phosphate (TOP); adipic acid ester-based plasticizers such as didecyl adipate (DDA) and diisodecyl adipate (DIDA); trimellitic acid ester-based plasticizers such as trioctyl trimellitate (TOTM) and tri-n-octyl-n-decyl trimellitate (nonyl DTM); polyester-based plasticizers; epoxy-based plasticizers; sebacic acid ester-based plasticizers; azelaic acid ester-based plasticizers; citric acid ester-based plasticizers; glycolic acid-based plasticizers; ricinoleic acid-based plasticizers; maleic acid ester-based plasticizers; fumaric acid ester-based plasticizers; pyromellitic acid ester-based plasticizers; and itaconic acid ester-based plasticizers.

The plasticizer is introduced into the resin composition layer by making the plasticizer coexist with the resin during coating of the resin. In this way, the target having a high affinity with an oil-based ink described below can be formed.

<Oil-Based Ink>

In the method for applying an ink of the present disclosure, an oil-based ink having no curing reactivity is used as the ink.

An oil-based ink of the present disclosure contains at least an oil constituent and a colorant, and may contain a binder resin as needed.

It is preferable that the oil-based ink contain an oil constituent having a boiling point of 200 degrees C. or higher in an amount of 80% by mass or greater.

It is preferable that the main component of the oil constituent of the oil-based ink be an ester oil.

The oil-based ink of the present disclosure contains an oil constituent and a colorant. In order to maintain a good ink fixability after printing, it is preferable that the oil-based ink contain an ester oil in an amount of 30% by mass or greater and more preferably 50% by mass or greater but 90% by mass or less. The oil-based ink of the present disclosure may also contain water in an amount of 5% by mass or less.

By using the oil-based ink having no curing reactivity as the ink and printing the ink on the resin composition layer under heating, it is possible to realize ink application that is unavailable by existing techniques, i.e., ink application that results in a good image quality with no special receiving layer provided for receiving an inkjet ink.

Examples of the ester oil that can be used as the oil constituent having a boiling point of 200 degrees C. or higher include: phthalic acid esters such as dibutyl phthalate, dicapryl phthalate, diisodecyl phthalate, dioctyl phthalate (DOP), diisononyl phthalate, dioctyl phthalate, butyl-2-ethylhexyl phthalate, and di-2-ethylhexyl phthalate; adipic acid esters such as dioctyl adipate (diethylhexyl adipate: DOA), and diisononyl adipate (DINA); sebacic acid esters such as dibutyl sebacate, dioctyl sebacate, and diisononyl sebacate; azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononylic acid esters such as ethylhexyl isononanoate and isononyl isononanoate.

In the present disclosure, adipic acid esters such as dioctyl adipate and diisononyl adipate and octanoic acid esters such as octyl octanoate are preferable for use, particularly, in an inkjet image forming system.

As the colorant in the oil-based ink, any hitherto-known colorant may be used. Examples of the colorant include: pigments such as carbon black, azo-based pigments, phthalocyanine-based pigments, nitroso-based pigments, nitro-based pigments, vat dye-based pigments, mordant dye-based pigments, basic dye-based pigments, acid dye-based pigments, and natural dye-based pigments; and oil colors such as diazo dyes and anthraquinone-based dyes. One of these dyes and pigments may be used alone or two or more of these dyes and pigments may be used as a mixture.

It is preferable that the oil-based ink be a pigment ink, because the colorant of the pigment ink hardly permeates the inside of the target and the pigment ink is less likely to be thermally damaged in a heating step during foaming, to make image density degradation less likely to occur.

It is preferable that a mass change rate of the oil-based ink of the present disclosure when the oil-based ink is left to stand at 150 degrees C. for 60 minutes be lower than 20% and more preferably 5% or lower, from the viewpoints that the oil-based ink does not undergo property changes by volatilization and can be printed stably and provide good image qualities by an inkjet method.

The mass change rate is a value calculated according to a calculation formula below.

$$\text{Mass change rate}(\%) = \frac{\text{mass before heating} - \text{mass after heating}}{\text{mass before heating}} \times 100 \quad \text{[Math. 1]}$$

Next, a specific example of the method for applying an ink of the present disclosure will be described by taking a case of producing a wallpaper as an example.

A wallpaper is formed of a target serving as an ink applying target and including: a base for a wallpaper; and a resin composition layer formed over the base for a wallpaper and containing a vinyl chloride resin and a plasticizer, and an ink layer formed over the resin composition layer of the target.

A method for producing a wallpaper may include a step of foaming a foaming agent by heating when the foaming agent is contained in the resin composition layer, or may not include a foaming step with no foaming agent contained in the resin composition layer.

In the following description, a method for producing a wallpaper when a foaming agent is contained in a resin composition layer will be described.

The method for producing a wallpaper is divided into an ink applying step of discharging an ink by an inkjet method onto a resin composition layer to form an image, a step of foaming a wallpaper, and an embossing step of forming a bossed-recessed pattern on a surface of the wallpaper.

In the method for producing a wallpaper of the present disclosure, a pretreatment step described below is applied to the target before the ink applying step, and a post-treatment step described below is applied to the target after the ink applying step.

Furthermore, a step of producing a target by forming a resin composition layer over a base may be added as a previous step before an inkjet printing step.

These steps may be performed individually in a batch-wise manner, but may also be performed in series continuously.

<Step of Producing Target>

The target is obtained by forming a resin composition layer over a base.

Examples of the method for coating a resin composition layer formed of materials such as a vinyl chloride resin, a plasticizer, and a foaming agent over a base include coating methods such as a knife coating method, a nozzle coating method, a die coating method, a lip coating method, a comma coating method, a gravure coating method, a rotary screen coating method, and a reverse roll coating method.

After coating, the vinyl chloride resin is heated to gelate. This makes it possible to form a resin composition layer containing the plasticizer.

The gelation temperature is preferably 150 degrees C. or higher but 190 degrees C. or lower, in order to provide the resin composition layer with a high ink absorbability, and to obtain a sufficient gelation for suppressing image bleeding after printing.

<Surface Treatment 1 for Target: Pretreatment Step>

The method for applying an ink of the present disclosure includes a pretreatment step of pre-treating a surface of the target with a surface treatment before the ink applying step. Examples of the method for the surface treatment in the pretreatment step include a heating treatment, a corona treatment, a plasma treatment, wiping with a dry cloth, wiping with water, wiping with an organic solvent such as alcohols and ketones, ultraviolet irradiation, and electron beam irradiation. The method is not limited to these treatments so long as any other methods can improve a wetting/spreading property between the target and the ink. A preferable wetting/spreading property of an ink can be obtained during ink application, by removal of stains on the gel-state surface of the target or by a temporary improvement of the chemical state of the surface.

<Ink Applying Step>

FIG. 1 illustrates a specific example of an inkjet-type ink applying apparatus configured for carrying out the present disclosure. As illustrated in FIG. 1, a target 1 obtained in the step of producing a target and including a resin composition layer over a base is pre-heated by a pre-heating drum 2 and then conveyed to an inkjet discharging unit 4 while being heated to a constant temperature by a heating drum 3. Ink liquid droplets discharged by the inkjet discharging unit 4 land on the target 1, allowing a desired image to be formed.

During ink application, it is preferable to apply the ink while heating the target.

<Surface Treatment 2 for Target: Post-Treatment Step>

The present disclosure is further characterized by including a post-treatment step of post-treating the surface of the target with a surface treatment after ink application.

Examples of the method for the surface treatment in the post-treatment step include contactless surface treatment methods without contact with the printed surface, such as a heating treatment, a corona treatment, a plasma treatment, ultraviolet irradiation, and electron beam irradiation. The method is not limited to these treatments so long as any other methods can improve a wetting/spreading property between the target and the ink.

The surface treatment in the post-treatment step can further increase the wetting/spreading property of the landed ink and improve solid coverage and image density. Although the pretreatment step has an effect of improving the wettability of the ink, the fluidic state of the gel-state surface of the soft vinyl chloride considerably reduces the effect of improving wettability within a period from the completion of the pretreatment until before ink application. Further, when the image forming unit as illustrated in FIG. 1 is used, conveying rollers contact the surface of the target at a few positions and reduce wettability imparted by the pretreatment. To this problem, application of the surface treatment in the post-treatment step for further improving wettability of the ink after landing can secure a good image quality needed in the present disclosure. This effect achieves a good result by means of combination of the treatments before and after ink application with the oil-based ink that has no curability/driability and can be absorbed into soft PVC gel. A concept diagram for this effect is illustrated in FIG. 2 (A to C).

In the case of applying a plurality of colors to the target, the heating treatment in the pretreatment step refers to a heating treatment performed in a state that no ink is present on the medium at all, and the heating treatment in the post-treatment step refers to a heating treatment performed after all of the ink colors have been applied to the medium.

From the viewpoint of productivity, it is preferable to perform the pretreatment step, the ink applying step, and the post-treatment step as continuous steps.

FIG. 2 (A to C) will be described.

In FIG. 2, S1, S2, and S3 indicate that the target is in the pretreatment step, the ink applying step, and the post-treatment step.

A of FIG. 2 illustrates a case where neither the pretreatment step nor the post-treatment step is performed. b1 indicates the ink applied to a target d.

B of FIG. 2 illustrates a case where a corona discharge treatment a is applied to the target in the pretreatment step but the post-treatment step is not performed. b2 indicates the ink applied to the target d.

C of FIG. 2 illustrates a case where a corona discharge treatment a is applied in both of the pretreatment step and the post-treatment step. b2 indicates the state of the ink after ink application, and b3 indicates the ink on the target d after the post-treatment step.

C of FIG. 2 illustrates a state that a wetting/spreading property of the ink over the surface of the target is improved when both of the pretreatment step and the post-treatment step are performed.

<Foaming/Bossed-Recessed Pattern Applying Unit>

In the present disclosure, in the case of producing a wallpaper, it is possible to add commonly used steps after a desired image is formed on the target by an inkjet printing unit, such as a foaming step of foaming the target after printing and an embossing step of imparting a bossed-recessed pattern to the target after printing.

—Foaming Step—

The foaming step is a step of foaming a heat foaming agent by heating the target including the resin composition layer containing the heat foaming agent in a dispersed state. As the heating conditions for foaming, it is preferable to perform heating at from 180 degrees C. through 230 degrees C. for from about some tens of seconds to about 2 minutes.

—Embossing Step—

The embossing step is a step of forming a bossed-recessed pattern on the foamed resin composition layer of the target.

The bossed-recessed pattern is formed by selecting and using a well-known method typically used for imparting bosses and recesses to, for example, wallpapers and decorative plates, such as embossing processing, chemical embossing processing, rotary screening processing, or flexographic printing. For example, it is preferable to use a method of imparting bosses and recesses by, for example, processing with an embossing plate, chemical embossing processing, rotary screening, or flexographic printing.

The embossing step may employ any of embossing with a cooling roller after heating, and a method of performing embossing in one step by hot roller embossing. In the case of a wallpaper, the embossing depth by the embossing processing is preferably from 0.08 mm through 0.50 mm. When the embossing depth is less than 0.08 mm, a stereoscopic effect may be poor. When the embossing depth is greater than 0.50 mm, abrasion resistance on the surface may be poor.

<Other Steps>

In the present disclosure, other units that may be typically employed in a wallpaper producing process may be appropriately selected as needed. For example, it is possible to apply a coating treatment for imparting scratch resistance.

Particularly, in the present disclosure, it is possible to prevent stickiness and improve a design property by providing a transparent protective layer by the coating treatment. For example, urethane-based resins, acrylic-based resins such as polymethyl methacrylate, and fluorine-based resins such as polyvinyl fluoride, polyvinylidene fluoride, and polytetrafluoroethylene are preferable for use as the protective layer.

As needed, these units may be employed both before and after each of the units included in wallpaper production.

EXAMPLES

The present disclosure will be more specifically described below by way of Examples. However, the present disclosure should not be construed as being limited to these Examples.

Target Production Example

Diisononyl phthalate (DINP) as a plasticizer (50 parts by mass) and a Ba/Zn-based stabilizer for vinyl chloride (available from ADEKA Corporation, ADEKASTAB AC-290) (3 parts by mass) were added together and stirred well, to form a mixture liquid. To the mixture liquid, an emulsion-polymerized polyvinyl chloride (available from Kaneka Corporation, PSL) (100 parts by mass), azodicarboxylic amide (ADCA) as a defoaming agent (5 parts by mass), calcium carbonate (90 parts by mass), and titanium dioxide (15 parts by mass) were added and mixed sufficiently with a disper-mixer, to obtain a resin composition layer forming material.

With a coater, the resin composition layer forming material was applied in an application amount of 130 $g/m^2$ to a surface of a sheet of natural paper having a mass of 80 $g/m^2$ serving as a base for a wallpaper, and left to stand at 120 degrees C. for 90 seconds, to bring polyvinyl chloride sol into a pre-gel state, to obtain a target.

<Production Example of Oil-Based Ink 1>

A mixture obtained by blending dioctyl adipate (DOA) (85 parts by mass), carbon black (REGAL 400) (10 parts by mass), and a dispersant SOLSPERSE 13940 (5 parts by mass) was subjected to a mixing/dispersion treatment using a bead mill disperser, to obtain an oil-based ink 1.

Fifty milligrams was taken out from the obtained oil-based ink 1 to measure a mass change rate at 150 degrees C. for 60 minutes with a thermogravimetric analyzer DTG-60 available from Shimadzu Corporation. As a result, the mass change rate was 4.8%.

<Production Example of Oil-Based Ink 2>

A mixture obtained by blending dioctyl adipate (DOA) (70 parts by mass), octyl palmitate (15 parts by mass), carbon black (REGAL 400) (10 parts by mass), and a dispersant SOLSPERSE 13940 (5 parts by mass) was subjected to a mixing/dispersion treatment using a bead mill disperser, to obtain an oil-based ink 2.

Fifty milligrams was taken out from the obtained oil-based ink 2 to measure a mass change rate at 150 degrees C. for 60 minutes with a thermogravimetric analyzer DTG-60 available from Shimadzu Corporation. As a result, the mass change rate was 7.8%.

Example 1

The target was passed through an IR heater (PRINT DRYER PROMO PD5102, available from Toko Co., Ltd.) at a power output of High at a speed of 30 m/min in a state that the target was put on an operation stage at a fixed gap of 40 cm from the heater.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through the IR heater mentioned above at a power output of High at a speed of 30 m/min in a state that the target was put on the operation stage at a fixed gap of 40 cm from the heater.

A halftone portion of the image was captured both immediately after ink application and after the post-treatment, with a microscope (KEYENCE VHX, available from Keyence Corporation) at a magnification of ×450, to compare the dot diameters using image processing software (IMAGE J). The image resulting from the post-treatment was further passed through an oven heated to 200 degrees C. at a speed of 50 m/min to be foamed, then subjected to embossing processing for a cloth texture pattern, and then evaluated in terms of (1) solid coverage, (2) image density, and (3) ink absorbability in the manners described below. The results are collectively presented in Table 1.

(1) Solid Coverage

A solid portion of the obtained image was captured with a microscope (KEYENCE VHX, available from Keyence Corporation) at a magnification of ×450. The captured image was then binarized with image processing software (IMAGE J), to calculate how much of the background of the target was covered by the ink as an area value, to obtain a coverage, which was evaluated according to the criteria described below. Photographic images with typical coverages are illustrated in FIG. 3A to FIG. 3D.

(Judging Criteria)
A: The coverage was 80% or higher.
B: The coverage was 70% or higher but lower than 80%.
C: The coverage was 60% or higher but lower than 70%.
D: The coverage was lower than 60%.

(2) Image Density

A solid portion of the obtained image was measured with a reflective/color spectrophotometric densitometer (available from X-Rite Inc.), to measure the image density according to the judging criteria described below.

(Judging Criteria)
A: The image density was 1.2 or higher.
B: The image density was 1.0 or higher but lower than 1.2.
C: The image density was 0.8 or higher but lower than 1.0.
D: The image density was lower than 0.8.

(3) Ink Absorbability

A printed portion of the obtained image was scratched 10 times with a sheet of paper LUMI ART GLOSS 130 GSM cut into a size of 1.2 mm on each side, to microscopically and visually observe the degree of how the image portion was blurred by frictioning, to judge ink absorbability according to the criteria described below.

(Judging Criteria)
A: The target was of a good level with no blurring of the printed matter.
B: The target was of a tolerable level with slight blurring observed microscopically but not conspicuous visually
C: The target was blurred to a level recognizably even visually
D: The target was of a practically unusable level with the ink spread in a liquid state over the scratched portion.

Example 2

The target was passed through an IR heater (PRINT DRYER PROMO PD5102, available from Toko Co., Ltd.) at a power output of High at a speed of 30 m/min in a state that the target was put on an operation stage at a fixed gap of 40 cm from the heater.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1. Further, the printed image was passed through a plasma treatment apparatus (available from Openair, RD1010) at a speed of 30 m/min to be treated in a state that the target was put on a moving stage.

The obtained image was evaluated in the same manners as in Example 1. The results are presented in Table 1.

Example 3

The target was passed through an IR heater (PRINT DRYER PROMO PD5102, available from Toko Co., Ltd.) at a power output of High at a speed of 30 m/min in a state that the target was put on an operation stage at a fixed gap of 40 cm from the heater.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

Example 4

The target was passed through a plasma treatment apparatus (available from Openair, RD1010) at a speed of 30 m/min to be treated in a state that the target was put on a moving stage.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through the IR heater mentioned above at a power output of High at a speed of 30 m/min in a state that the target was put on the operation stage at a fixed gap of 40 cm from the heater.

The obtained image was evaluated in the same manners as in Example 1. The results are presented in Table 1.

Example 5

The target was passed through a plasma treatment apparatus (available from Openair, RD1010) at a speed of 30 m/min to be treated in a state that the target was put on a moving stage.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

Further, the printed image was passed through the plasma treatment apparatus (available from Openair, RD1010) at a speed of 30 m/min to be treated in a state that the target was put on a moving stage.

The obtained image was evaluated in the same manners as in Example 1. The results are presented in Table 1.

Example 6

The target was passed through a plasma treatment apparatus (available from Openair, RD1010) at a speed of 30 m/min to be treated in a state that the target was put on a moving stage.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

Example 7

The target was passed through a corona treatment apparatus (available from Kasuga Company, with an insulating equipment treatment station) at the maximum power output at a speed of 30 m/min to be treated in a state that the target was pasted on the surface of a paper roll with a tape.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through the IR heater mentioned above at a power output of High at a speed of 30 m/min in a state that the target was put on an operation stage at a fixed gap of 40 cm from the heater.

The obtained image was evaluated in the same manners as in Example 1. The results are presented in Table 1.

Example 8

The target was passed through a corona treatment apparatus (available from Kasuga Company, with an insulating equipment treatment station) at the maximum power output at a speed of 30 m/min to be treated in a state that the target was pasted on the surface of a paper roll with a tape.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a plasma treatment apparatus (available from Openair, RD1010) at a speed of 30 m/min to be treated in a state that the target was put on a moving stage.

The obtained image was evaluated in the same manners as in Example 1. The results are presented in Table 1.

Example 9

The target was passed through a corona treatment apparatus (available from Kasuga Company, with an insulating equipment treatment station) at the maximum power output at a speed of 30 m/min to be treated in a state that the target was pasted on the surface of a paper roll with a tape.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

Example 10

The surface of the target was wiped with non-woven fabric for wiping (available from Asahi Kasei Corporation, BEMCOT) 3 times in a reciprocating manner.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through the IR heater mentioned above at a power output of High at a speed of 30 m/min in a state that the target was put on an operation stage at a fixed gap of 40 cm from the heater.

The obtained image was evaluated in the same manners as in Example 1. The results are presented in Table 1.

Example 11

The surface of the target was wiped with non-woven fabric for wiping (available from Asahi Kasei Corporation, BEMCOT) 3 times in a reciprocating manner.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a plasma treatment apparatus (available from Openair, RD1010) at a speed of 30 m/min to be treated in a state that the target was put on a moving stage.

The obtained image was evaluated in the same manners as in Example 1. The results are presented in Table 1.

Example 12

The surface of the target was wiped with non-woven fabric for wiping (available from Asahi Kasei Corporation, BEMCOT) 3 times in a reciprocating manner.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink 1.

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

Example 13

An image was obtained in the same manner as in Example 7, except that unlike in Example 7, the oil-based ink 1 was changed to the oil-based ink 2.

The obtained image was evaluated in the same manners as in Example 1. The results are presented in Table 1.

Example 14

An image was obtained in the same manner as in Example 12, except that unlike in Example 12, the oil-based ink 1 was changed to the oil-based ink 2.

The obtained image was evaluated in the same manners as in Example 1. The results are presented in Table 1.

Comparative Example 1

The target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

The obtained image was evaluated in the same manners as in Example 1. The results are presented in Table 1.

Comparative Example 2

The target was passed through an IR heater (PRINT DRYER PROMO PD5102, available from Toko Co., Ltd.) at a power output of High at a speed of 30 m/min in a state that the target was put on an operation stage at a fixed gap of 40 cm from the heater.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

The obtained image was evaluated in the same manners as in Example 1. The results are presented in Table 1.

Comparative Example 3

The target was passed through a plasma treatment apparatus (available from Openair, RD1010) at a speed of 30 m/min to be treated in a state that the target was put on a moving stage.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

The obtained image was evaluated in the same manners as in Example 1. The results are presented in Table 1.

Comparative Example 4

A printed image was passed through a corona treatment apparatus (available from Kasuga Company, with an insulating equipment treatment station) at the maximum power output at a speed of 30 m/min to be treated in a state that the target was pasted on the surface of a paper roll with a tape.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

The obtained image was evaluated in the same manners as in Example 1. The results are presented in Table 1.

Comparative Example 5

The surface of the target was wiped with non-woven fabric for wiping (available from Asahi Kasei Corporation, BEMCOT) 3 times in a reciprocating manner.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

The obtained image was evaluated in the same manners as in Example 1. The results are presented in Table 1.

Comparative Example 6

The target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

Further, the printed image was passed through the IR heater mentioned above at a power output of High at a speed of 30 m/min in a state that the target was put on an operation stage at a fixed gap of 40 cm from the heater.

The obtained image was evaluated in the same manners as in Example 1. The results are presented in Table 1.

Comparative Example 7

The target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

Further, the printed image was passed through a plasma treatment apparatus (available from Openair, RD1010) at a speed of 30 m/min to be treated in a state that the target was put on a moving stage.

The obtained image was evaluated in the same manners as in Example 1. The results are presented in Table 1.

Comparative Example 8

The target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section filled with the oil-based ink.

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

Comparative Example 9

The target was passed through a corona treatment apparatus (available from Kasuga Company, with an insulating equipment treatment station) at the maximum power output at a speed of 30 m/min to be treated in a state that the target was pasted on the surface of a paper roll with a tape.

Next, within 1 minute, the target was fixed on a hot plate heated to 120 degrees C. with a heat-resistant double-face tape, and printing was performed on the target at 600 dpi at a 32-tone gray scale with an image forming apparatus obtained by remodeling an inkjet printer (IPSIO GX5500, available from Ricoh Company, Ltd.) to allow the hot plate to be introduced to an ink printing section. The ink used for image formation was a water-based ink attached to the inkjet printer (IPSIO GX5500, available from Ricoh Company, Ltd.).

Further, the printed image was passed through a corona treatment apparatus (available from Kasuga Company, with an insulating equipment treatment station) at the maximum power output at a speed of 30 m/min to be treated in a state that the target was pasted on the surface of a paper roll with a tape.

The obtained image was evaluated in the same manners as in Example 1. The results are presented in Table 1.

TABLE 1

| | Ink | Pre-treatment | Post-treatment | Dot diameter after ink application (micrometer) | Dot diameter after post-treatment (micrometer) | Solid coverage | Image density | Ink absorbability |
|---|---|---|---|---|---|---|---|---|
| Ex. 1 | Ink 1 | Heating | Heating | 42 | 60 | C | B | A |
| Ex. 2 | Ink 1 | Heating | Plasma | 42 | 63 | B | B | B |
| Ex. 3 | Ink 1 | Heating | Corona | 42 | 63 | B | B | B |

TABLE 1-continued

|  | Ink | Pre-treatment | Post-treatment | Dot diameter after ink application (micrometer) | Dot diameter after post-treatment (micrometer) | Solid coverage | Image density | Ink absorbability |
|---|---|---|---|---|---|---|---|---|
| Ex. 4 | Ink 1 | Plasma | Heating | 53 | 65 | B | B | A |
| Ex. 5 | Ink 1 | Plasma | Plasma | 53 | 76 | A | A | B |
| Ex. 6 | Ink 1 | Plasma | Corona | 53 | 77 | A | A | B |
| Ex. 7 | Ink 1 | Corona | Heating | 55 | 70 | A | B | A |
| Ex. 8 | Ink 1 | Corona | Plasma | 55 | 74 | A | A | B |
| Ex. 9 | Ink 1 | Corona | Corona | 55 | 78 | A | A | B |
| Ex. 10 | Ink 1 | Wiping | Heating | 48 | 62 | B | B | B |
| Ex. 11 | Ink 1 | Wiping | Plasma | 48 | 66 | B | B | B |
| Ex. 12 | Ink 1 | Wiping | Corona | 48 | 64 | B | B | B |
| Ex. 13 | Ink 2 | Corona | Heating | 55 | 61 | B | C | A |
| Ex. 14 | Ink 2 | Wiping | Corona | 48 | 57 | C | B | A |
| Comp. Ex. 1 | Ink 1 | — | — | 35 | — | D | D | D |
| Comp. Ex. 2 | Ink 1 | Heating | — | 42 | — | D | D | C |
| Comp. Ex. 3 | Ink 1 | Plasma | — | 53 | — | D | D | C |
| Comp. Ex. 4 | Ink 1 | Corona | — | 55 | — | C | C | C |
| Comp. Ex. 5 | Ink 1 | Wiping | — | 48 | — | D | C | C |
| Comp. Ex. 6 | Ink 1 | — | Heating | — | 53 | D | D | C |
| Comp. Ex. 7 | Ink 1 | — | Plasma | — | 52 | D | D | D |
| Comp. Ex. 8 | Ink 1 | — | Corona | — | 54 | C | C | D |
| Comp. Ex. 9 | Water-based ink | Corona | Corona | 45 | 46 | D | D | A |

As presented in Table 1, it was confirmed that the target formed of soft vinyl chloride had good ink wetting/spreading properties (dot diameters), and achieved good results in any of solid coverage, image density, and ink absorbability when an image was formed on the target according to a method including surface treatment units immediately before and immediately after image formation, with the use of an oil-based ink having no curing reactivity.

In the case of an image forming method including only any one or none of a pretreatment and a post-treatment as the surface treatment, it was impossible to secure a sufficient wetting/spreading property and a sufficient absorption of the ink, leading to a poor image quality. Furthermore, when a water-based ink having driability was used as the ink, ink fixability along with drying was good, but the ink had a poor wetting/spreading property and was not able to express a sufficient solid coverage.

REFERENCE SIGNS LIST

1: target
2: pre-heating drum
3: heating drum
4: inkjet discharging unit
a: corona discharge
b1, b2, b3, b4: ink
d: target
S1: pretreatment step
S2: ink applying step
S3: post-treatment step

The invention claimed is:

1. A method for applying an oil-based ink to a resin composition layer of a target that comprises a base and the resin composition layer formed over a surface of the base, the method comprising:
   pre-treating a surface of the resin composition layer before the oil-based ink is applied, with at least one surface treatment for improving a wetting/spreading property of the oil-based ink;
   applying the oil-based ink to the surface of the resin composition layer that has undergone the pre-treating; and
   post-treating the surface of the resin composition layer after the oil-based ink is applied, with at least one surface treatment for improving a wetting/spreading property of the oil-based ink;
   wherein the applying step comprises applying the oil-based ink directly to the pre-treated surface of the resin composition layer.

2. The method for applying an ink according to claim 1, wherein a mass change rate of the oil-based ink when the oil-based ink is left to stand at 150 degrees C. for 60 minutes is 5% or lower.

3. The method for applying an ink according to claim 1, wherein at least one of the at least one surface treatment in the pre-treating or the post-treating is a heating treatment.

4. The method for applying an ink according to claim 1, wherein at least one of the at least one surface treatment in the pre-treating or the post-treating is a plasma treatment.

5. The method for applying an ink according to claim 1, wherein at least one of the at least one surface treatment in the pre-treating or the post-treating is a corona treatment.

6. The method for applying an ink according to claim 1, wherein at least one of the at least one surface treatment in the pre-treating or the post-treating is a wiping treatment by physical contact with the surface of the resin composition layer.

7. The method for applying an ink according to claim 1, wherein the oil-based ink comprises a pigment ink.

8. The method for applying an ink according to claim 1, wherein the resin composition layer comprises a plasticizer.

9. The method of claim 1, wherein the resin composition layer comprises a foaming agent; and
the pre-treating and post-treating steps are performed before a foaming step of foaming the resin composition layer by heating.

10. The method of claim 1, wherein no other layers are formed on the resin composition layer prior to the step of applying the oil-based ink to the surface of the resin composition layer.

11. A method for producing a wallpaper by applying an oil-based ink to a resin composition layer of a target that comprises a base and the resin composition layer formed over a surface of the base, the method comprising:
pre-treating a surface of the resin composition layer before the oil-based ink is applied, with at least one surface treatment for improving a wetting/spreading property of the oil-based ink;
applying the oil-based ink to the surface of the resin composition layer that has undergone the pre-treating; and
post-treating the surface of the resin composition layer after the oil-based ink is applied, with at least one surface treatment for improving a wetting/spreading property of the oil-based ink;
wherein the applying step comprises applying the oil-based ink directly to the pre-treated surface of the resin composition layer.

12. The method for producing a wallpaper according to claim 11, further comprising embossing a wallpaper obtained through the post-treating, to form a bossed-recessed pattern on the wallpaper.

13. The method for producing a wallpaper according to claim 11,
wherein the resin composition layer comprises a foaming agent, and
wherein the method further comprises:
heating a wallpaper obtained through the post-treating, to foam the resin composition layer; and
embossing the resin composition layer after the heating, to form a bossed-recessed pattern on the resin composition layer.

14. A method for applying an ink, the method being intended to apply an oil-based ink to a resin composition layer of a target that comprises a base and the resin composition layer formed over a surface of the base, the method comprising:
pre-treating the target before the oil-based ink is applied, with at least one surface treatment for improving a wetting/spreading property of the oil-based ink;
applying the oil-based ink to the target that has undergone the pre-treating; and
post-treating the target after the oil-based ink is applied, with at least one surface treatment for improving a wetting/spreading property of the oil-based ink,
wherein a mass change rate of the oil-based ink when the oil-based ink is left to stand at 150 degrees C. for 60 minutes is 5% or lower.

* * * * *